United States Patent
Harp et al.

[11] Patent Number: 5,549,816
[45] Date of Patent: Aug. 27, 1996

[54] RE-USABLE PISTON FILTER SYSTEM

[75] Inventors: Daniel L. Harp, Berthoud; Gary Johnson; Joe Myers, Both of Loveland, all of Colo.

[73] Assignee: Hach Company, Loveland, Colo.

[21] Appl. No.: 551,177

[22] Filed: Oct. 31, 1995

[51] Int. Cl.[6] .................................................. B01D 33/01
[52] U.S. Cl. .......................... 210/120; 210/359; 210/472; 210/497.01; 422/101
[58] Field of Search ...................................... 210/120, 136, 210/359, 436, 472, 483, 497.01; 422/101

[56] References Cited

U.S. PATENT DOCUMENTS

| | | | |
|---|---|---|---|
| 1,386,340 | 8/1921 | Wuster | 210/359 |
| 3,233,980 | 2/1966 | Fox et al. | 210/359 |
| 3,512,940 | 5/1970 | Shapiro . | |
| 3,608,736 | 9/1971 | Wong . | |
| 4,485,015 | 11/1984 | Smith . | |
| 4,643,981 | 2/1987 | Card | 210/359 |
| 4,800,020 | 1/1989 | Savas et al. | 210/359 |
| 4,832,842 | 5/1989 | Limb . | |
| 4,832,850 | 5/1989 | Cais et al. | 210/638 |
| 4,859,336 | 8/1989 | Savas . | |
| 4,897,193 | 1/1990 | Cais et al. | 210/359 |
| 4,909,932 | 3/1990 | Monnet | 210/359 |
| 4,957,637 | 9/1990 | Cornell | 210/359 |
| 4,990,253 | 2/1991 | Vcelka et al. | 210/359 |
| 5,264,184 | 11/1993 | Aysta . | |
| 5,411,661 | 5/1995 | Heiligman . | |

*Primary Examiner*—W. L. Walker
*Attorney, Agent, or Firm*—Dean P. Edmundson

[57] ABSTRACT

A re-usable piston filter including an elongated tubular barrel member with a closed lower end and an open upper end, an elongated tubular piston member having an open upward end and a fluid-permeable lower end, and filter means detachably secured to the lower end of the piston. Downward movement of the piston in the barrel forces liquid in the barrel through the filter and into the tubular piston. An air valve in the barrel can be opened to enable the piston to be withdrawn from the barrel. The filter at the lower end of the piston can be changed or removed as desired.

4 Claims, 2 Drawing Sheets

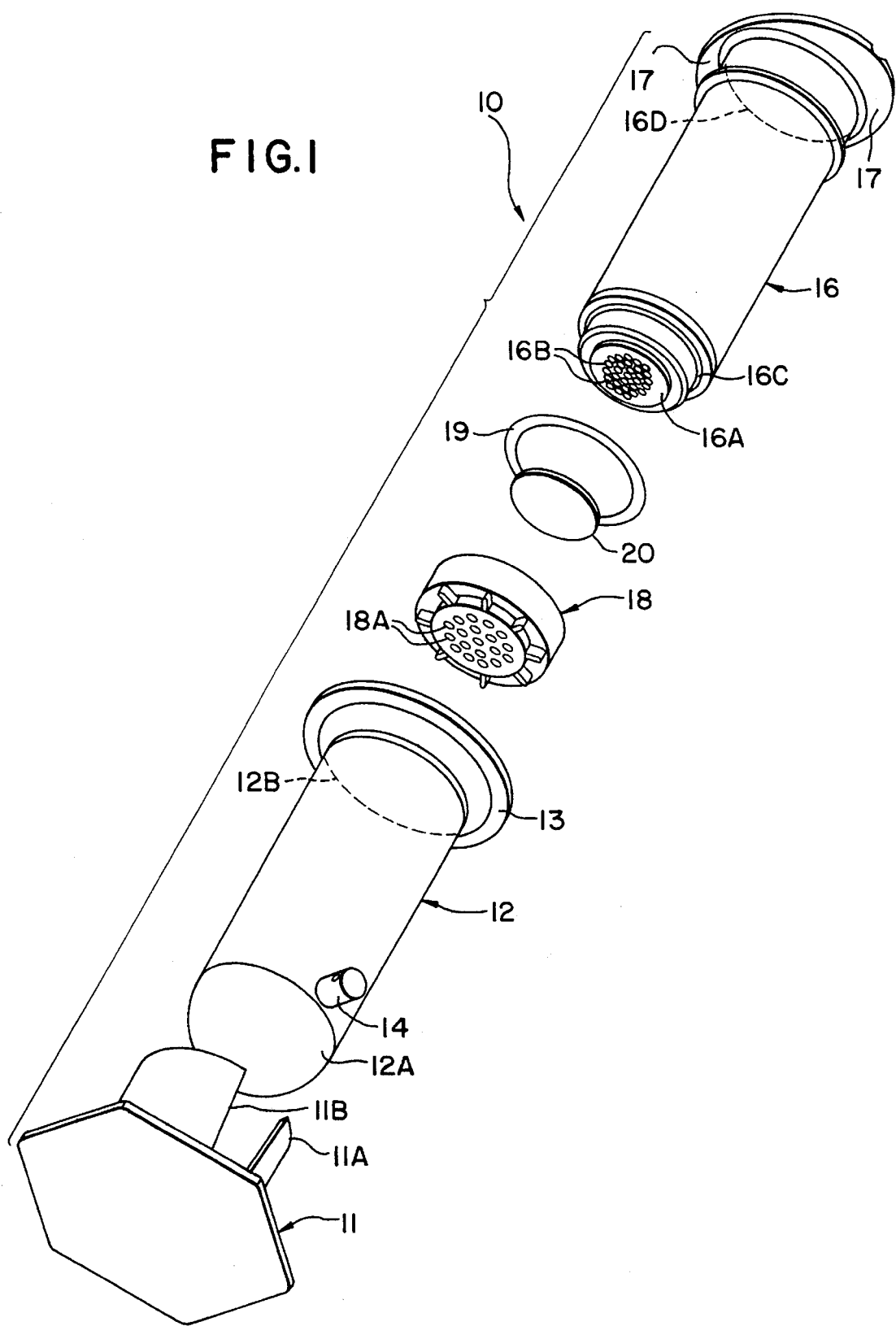

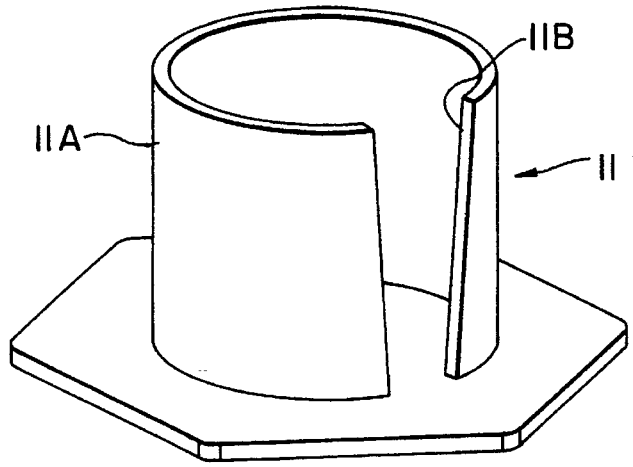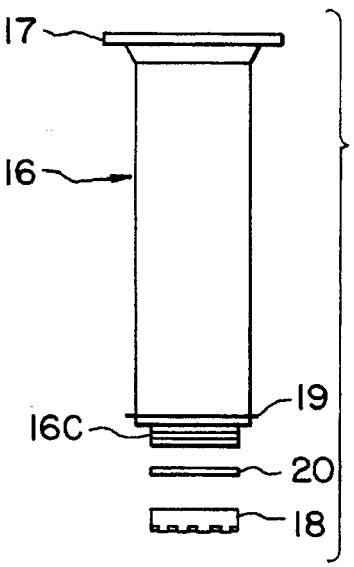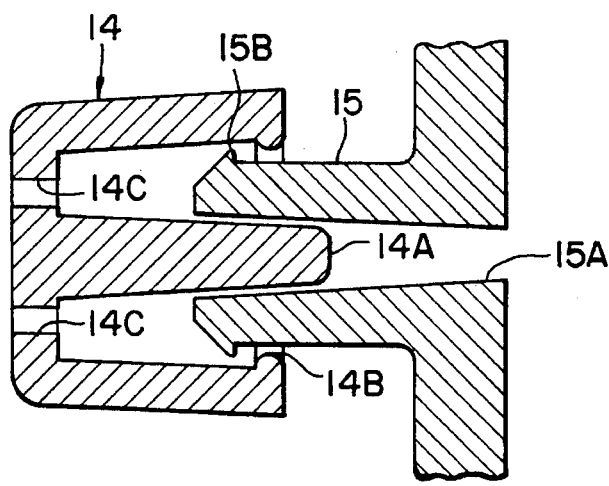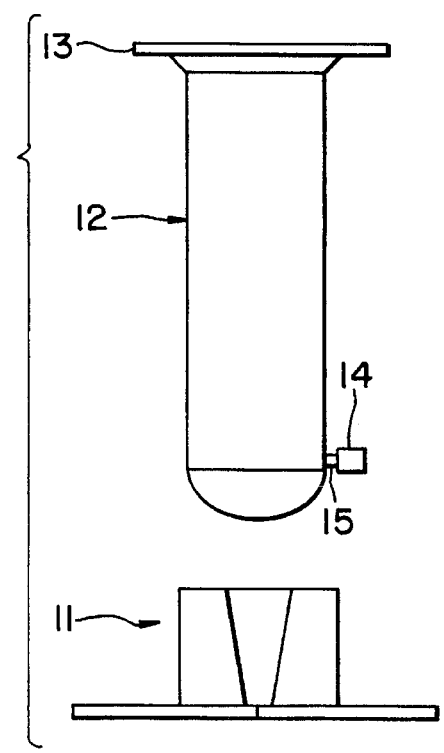

RE-USABLE PISTON FILTER SYSTEM

FIELD OF THE INVENTION

This invention relates to filtering system. More particularly, this invention relates to filter systems for filtering solids from liquid samples. Even more particularly, this invention relates to filter systems which are re-usable.

BACKGROUND OF THE INVENTION

Various types of piston filter systems have been used for filtering solid particles from liquid samples. Some of such filter systems are designed and intended as single use devices, i.e., they cannot be used for more than one single filtering of a single sample. Filter systems of this type are described, for example, in U.S. Pat. Nos. 3,512,940; 4,643,981; 4,800,020; 4,832,850; 4,897,193; and 4,990,253. Some of the devices are intended for quantitative separation wherein all of the liquid sample must pass through a filter.

There has not heretofore been provided a piston filter system in which the filter media can be replaced so that the filter system can be re-used. Usually the filter disc in the prior devices is held in place by a plastic retaining ring or is ultrasonically or heat sealed in place. This is reflected in the single-use application of such prior devices.

SUMMARY OF THE INVENTION

In accordance with the present invention there is provided a re-usable piston filter system which is especially useful for simple and rapid qualitative filtering of liquid samples. In a preferred embodiment the filter system comprises a cylindrical tubular barrel having a closed lower end and an open upper end, a cylindrical tubular piston body which is open at its upper end (and fluid permeable at its lower end), and filter means detachably secured to the lower end of the piston body.

The piston body has an external diameter sized to be closely received within the cylindrical barrel in a manner such that a liquid sample contained in the barrel is forced through the filter means in the lower end of the piston as the piston is urged downwardly in the barrel. The liquid goes into the longitudinal bore or cavity in the piston. The solids which are prevented from passing through the filter means, remain in the lower end of the barrel or are captured in the filter means. An 0-ring or seal around the perimeter of the lower end of the piston assures that the liquid sample cannot leak past the piston as it is moved downwardly in the barrel.

A valve near the lower end of the barrel can be closed when the liquid sample is in the barrel, and it can be opened after the piston has been moved to its downward position in the barrel, and after the filtered liquid sample in the piston cavity has been decanted, so as to enable air to enter the lower end of the barrel when the piston is pulled out of the barrel.

The barrel preferably has a rounded lower end which can be received and supported in a base member or stand. The barrel design stops downward movement of the piston at a predetermined point. This is necessary for effective operation of the air valve. The valve is located below the sealing O-ring between the piston and barrel and above the unfiltered fluid.

Preferably the lower end of the piston is threaded, and a perforated threaded cap with an internal O-ring is adapted to contain a replaceable filter. When the cap is threaded onto the lower end of the piston, the filter media is firmly retained at the base of the piston. As the piston is moved downwardly in the barrel, the liquid sample passes through the perforations or openings in the cap, then through the filter media, and then into the interior bore or cavity of the piston. Any desired standard filter media may be used in the system, including commercially available disks composed of paper, plastic films, or fiber mats. Example filters would be of cellulose acetate, glass fibers, or polymeric construction, with a porous design to trap particles or microbiological organisms. The porosity of such filters may typically vary from 0.2 to 5 micrometers in diameter.

Other advantages of the piston filter system of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIG. 1 is an exploded view showing a preferred embodiment of piston filter system of the invention;

FIG. 2 is a perspective view of one type of base member useful in this invention;

FIG. 3 is a side elevational view of the barrel which is useful herein;

FIG. 4 is an exploded view of the piston, filter media, and cap useful herein;

FIG. 5 is a cross-sectional view of one embodiment of valve member useful in this invention.

DETAILED DESCRIPTION OF THE INVENTION

In the drawings there is shown a preferred embodiment of piston filter system 10 of the invention. There is included an elongated cylindrical barrel member 12 having a closed lower end 12A and an open upper end 12B. An air valve 14 is located near the lower end of the barrel. The air valve is movable between closed and open positions. When the air valve is in the closed position, air is prevented from entering the lower end of the barrel. In order to retract the piston 16 from the barrel after it has been inserted completely therein, it is necessary to open valve 14 on tube 15 to enable air to enter the lower end of the barrel.

As shown in FIG. 5, the valve 14 includes a finger 14A which is slightly tapered and which is received in the tapered internal bore 15A of tube 15. When the valve is moved inwardly (i.e., toward the barrel 12), the finger 14A frictionally engages the internal bore 15A and prevents air flow through tube 15. When the valve is moved outwardly, air can pass through openings 14C and then through tube 15 into the barrel. Ridge 14B on the valve and flange 15B on the outer end of tube 15 prevent the valve from separating from the tube (although if sufficient force is used it is possible to pull the valve completely off of tube 15).

The elongated piston 16 has a lower end 16A which includes a plurality of apertures 16B therein, and threads 16C which encircle the lower end. A threaded cap member 18 (which includes a plurality of apertures 18A) can be threaded onto the lower end of the piston. A filter media 20 (e.g., a conventional filter disk) is adapted to be captured and retained between the cap 18 and the lower end of the piston 16.

The piston has an open upper end 16D, and the interior of the piston is also open so as to receive the liquid sample initially placed in the barrel 12. Thus, as the piston is forced downwardly into the barrel 12, the liquid in the barrel is forced through the apertures in the cap and the lower end of the piston (and also through the filter media). An O-ring 19 is preferably included around the perimeter of the lower end of the piston.

In this manner, a liquid sample can be effectively and efficiently filtered (e.g., to remove solid particles). Any type of filter media may be used in the apparatus of this invention, e.g., paper, plastic film, fiber mat, etc. One type of filter is used for particle removal and another type is used for extracting certain chemical compounds from a fluid.

The base 11 includes a horizontal planar base and an upwardly extending cylindrical wall member 11A which has an interior diameter slightly larger than the outside diameter of the barrel 12. Preferably the wall member includes a vertically-oriented slot 1ib to accommodate the valve 14 on the barrel. The barrel 12 can be conveniently placed into the base to support the barrel in an upright position.

The upper end of the piston preferably includes ear members 17 to facilitate gripping of the piston and also to facilitate pushing the piston downward into the barrel. The upper end of the barrel also preferably includes a flange 13 which extends completely or partially around the barrel.

The ability to separate the piston from the barrel without damage to the filter media or the piston is a very significant advantage and enables the filter system to be re-usable. Because the filter media can be removed without damage, it can be re-used, or further examined, or subjected to additional testing. The filter media can be changed at any time. Also, there is no damage to the seals when separating the piston from the barrel.

It is possible to use a different type of air valve on the barrel 12, e.g., any type of open/closed valve. As another possible variation, the cap could be attached to the lower end of the piston by means of a bayonet mount in which the cap is pushed on and then turned to lock the cap in place.

Another possible variation is to stack a plurality of filters in the cap. For example, a pre-filter (e.g., with a 3 micron porosity) could be used together with another filter of 0.5 micron porosity. The larger pore filter would be placed at the bottom of the cap.

Other variants are also possible without departing from the scope of the invention.

What is claimed is:

1. A re-usable piston filter system comprising:
   (a) an elongated tubular barrel member having a closed lower end and an open upper end; wherein said barrel member further includes an air valve which is movable between open and closed positions;
   (b) an elongated tubular piston member having an open upper end and fluid permeable lower end;
   (c) filter means detachably secured to said lower end of said piston member;
   wherein said piston member is sized to be received in said barrel member; wherein downward movement of said piston member in said barrel forces liquid in said barrel member through said filter means into said tubular piston member.

2. A filter system in accordance with claim 1, further comprising a base member for supporting said barrel member in an upright position.

3. A filter system in accordance with claim 1, wherein said lower end of said barrel member is rounded.

4. A filter system in accordance with claim 1, further comprising a cap member for detachably securing said filter means to said lower end of said piston; wherein said cap member is fluid-permeable.

* * * * *